(12) United States Patent
Schoonover et al.

(10) Patent No.: US 10,371,285 B2
(45) Date of Patent: Aug. 6, 2019

(54) PREDICTING MAINTENANCE REQUIREMENTS FOR A VALVE ASSEMBLY

(71) Applicant: Dresser, Inc., Addison, TX (US)

(72) Inventors: Larry Gene Schoonover, Falmouth, MA (US); Justin Scott Shriver, Newton, MA (US)

(73) Assignee: Dresser, LLC, Addison, TX (US)

( * ) Notice: Subject to any disclaimer, the term of this patent is extended or adjusted under 35 U.S.C. 154(b) by 297 days.

(21) Appl. No.: 14/924,352

(22) Filed: Oct. 27, 2015

(65) Prior Publication Data

US 2017/0114927 A1    Apr. 27, 2017

(51) Int. Cl.
*F16K 37/00* (2006.01)
*G05B 23/02* (2006.01)

(52) U.S. Cl.
CPC ...... *F16K 37/0083* (2013.01); *G05B 23/0283* (2013.01); *G05B 2219/33326* (2013.01)

(58) Field of Classification Search
CPC ...... G05B 23/0283; G05B 2219/33326; F16K 37/0083
See application file for complete search history.

(56) References Cited

U.S. PATENT DOCUMENTS

| | | | |
|---|---|---|---|
| 4,980,825 A | 12/1990 | Tootell et al. | |
| 5,549,137 A * | 8/1996 | Lenz | G05D 7/005 137/486 |
| 5,616,824 A | 4/1997 | Abdel-Malek et al. | |
| 6,272,401 B1 * | 8/2001 | Boger | F15B 5/006 700/282 |
| 6,735,549 B2 | 5/2004 | Ridolfo | |
| 6,745,107 B1 | 6/2004 | Miller | |
| 6,847,918 B2 | 1/2005 | Loecher | |
| 7,025,090 B2 | 4/2006 | Bramley et al. | |
| 7,415,376 B1 | 8/2008 | Hurley | |
| 7,606,636 B2 | 10/2009 | Dykstra | |
| 8,391,998 B2 | 3/2013 | Weinzierl et al. | |
| 8,442,688 B2 | 5/2013 | Loutfi | |
| 9,126,341 B1 | 9/2015 | Meller et al. | |

(Continued)

FOREIGN PATENT DOCUMENTS

EP    2687935 A2    1/2014

OTHER PUBLICATIONS

Lyon et al, Failure Analysis Informing Intelligent Asset Management, Jan. 2015.*

(Continued)

*Primary Examiner* — Mohammad K Islam
(74) *Attorney, Agent, or Firm* — Paul Frank + Collins P.C.

(57) ABSTRACT

A system and method for predicting failure conditions on a valve assembly. The method can include stages for comparing a maintenance variable to a threshold criteria, each related to an operating feature that uses operating data to quantify operation of a valve assembly, the threshold criteria associating an operating pattern found in the operating data with a failure mode on the valve assembly. The method can also include stages for selecting a maintenance task according to a relationship between the maintenance variable and the threshold criteria, the maintenance task related to the failure mode. The method can further include stages for generating an output conveying the maintenance task.

8 Claims, 8 Drawing Sheets

(56) References Cited

U.S. PATENT DOCUMENTS

| | | | |
|---|---|---|---|
| 2006/0015217 A1* | 1/2006 | Hagihara | G05B 5/01 700/250 |
| 2007/0089435 A1 | 4/2007 | Singh et al. | |
| 2007/0150079 A1* | 6/2007 | Blevins | G05B 23/0251 700/41 |
| 2008/0004836 A1* | 1/2008 | Tewes | G05B 23/0221 702/182 |
| 2008/0133178 A1* | 6/2008 | Byrne | G05B 23/0235 702/184 |
| 2009/0055130 A1* | 2/2009 | Pandey | G05B 23/0254 702/183 |
| 2009/0222220 A1* | 9/2009 | Wilke | F16K 37/0091 702/34 |
| 2010/0106458 A1* | 4/2010 | Leu | F04B 49/065 702/181 |
| 2012/0285744 A1* | 11/2012 | Bernard | E21B 21/08 175/57 |
| 2012/0290261 A1* | 11/2012 | Genta | G05B 23/00 702/179 |
| 2012/0317058 A1* | 12/2012 | Abhulimen | G06N 20/00 706/2 |
| 2013/0085717 A1 | 4/2013 | Selvaraj et al. | |
| 2013/0218484 A1 | 8/2013 | Kar et al. | |
| 2015/0032270 A1* | 1/2015 | Gattu | F15B 19/005 700/282 |
| 2015/0277445 A1* | 10/2015 | Wheeler | G05D 7/0635 700/282 |

OTHER PUBLICATIONS

Fernando et al, Articial Neural Networks for Fault Detection and Identification on an Automated Assembly Machine, May 2014.*

Sundarmahesh et al. Fault Diagnosis of Pneumatic Valve with DAMADICS Simulator using ANN based Classifier Approach, 2013.*

Zhang, A new method to predict the occurrence of stick-slip in pneumatic cylinders, 2005.*

A PCT Search Report and Written Opinion issued in connection with corresponding PCT Application No. PCT/US16/057278 dated Jan. 3, 2017.

* cited by examiner

PREDICTING MAINTENANCE REQUIREMENTS FOR A VALVE ASSEMBLY

BACKGROUND

Process lines include flow controls to regulate a flow of fluid. These flow controls may incorporate numerous mechanical and electro-mechanical components. From time-to-time, one or more components may wear and/or fail, resulting in changes in operation of the flow control. Ultimately, these changes may cause a flow of fluid in a process line to deviate away from one or more desired process parameters.

SUMMARY

The subject matter disclosed herein relates generally to predicting maintenance requirements and potential failure modes on a valve assembly.

Some embodiments herein may incorporate elements and features, one or more of the elements and features being interchangeable and/or combinable in various combinations, examples of which may include:

A system that may include a management server having a processor with access to executable instructions, the executable instructions are configured to, when executed by the management server, cause the management server to, acquire operating data that describes operation of a valve assembly, calculate one or more operating feature from the operating data, the operating feature quantifying operation of the valve assembly, calculate a maintenance variable; compare the maintenance variable to a threshold criteria related to the operating feature, the threshold criteria associating an operating pattern found in the operating data with a failure mode on the valve assembly, select a maintenance task according to a relationship between the maintenance variable and the threshold criteria, the maintenance task related to the failure mode, and generate an output conveying the maintenance task.

The system also wherein the maintenance variable corresponds to a key performance indicator that defines performance of the valve assembly.

The system also wherein the executable instructions further configure the management server to calculate the key performance indicator using the operating data.

The system also wherein the threshold criteria comprises a maximum value for the key performance indicator.

The system also wherein the maintenance variable includes a pattern coefficient that modifies a value of the operating feature.

The system also wherein the maintenance variable integrates more than one of the pattern coefficient and more than one of the operating feature.

The system also wherein the maintenance variable takes the form of a linear equation.

The system also wherein the executable instructions further configure the management server to calculate the maintenance variable in accordance with, $$M = C_i X_i + C_{i+n} X_{i+n} \ldots,$$

wherein M is the maintenance variable, Ci is a first pattern coefficient, Xi is a first operating feature, Ci+n is a second pattern coefficient, Xi=n is a second operating feature, and n is an integer having consecutive values.

The system also wherein the executable instructions further configure the management server to receive data from a remote device, to incorporate the data into a training set of data, and to calculate the pattern coefficient using the training set of data.

The system also wherein the executable instructions further configure the management server to update the relationship between the maintenance variable and the threshold criteria in accordance with the pattern coefficient.

A valve assembly that may include a valve comprising a closure member that is configured to move relative to a seat, and a valve positioner configured to, acquire operating data that describes operation of a valve assembly, calculate one or more operating feature from operating data defining operation of the valve assembly, the operating feature quantifying operation of the valve assembly; calculate a maintenance variable, compare the maintenance variable to a threshold criteria related to the operating feature, the threshold criteria associating an operating pattern found in the operating data with a failure mode on the valve assembly, select a maintenance task according to a relationship between the maintenance variable and the threshold criteria, the maintenance task related to the failure mode, and generate an output conveying the maintenance task.

The valve assembly also wherein the maintenance variable corresponds to a key performance indicator that defines performance of the valve assembly.

The valve assembly also wherein the maintenance variable includes a pattern coefficient that modifies a value of the operating feature.

The valve assembly also wherein the maintenance variable integrates more than one of the pattern coefficient and more than one of the operating feature.

The valve assembly also wherein the valve positioner is further configured to calculate the maintenance variable in accordance with, $$M = C_i X_i + C_{i+n} X_{i+n} \ldots,$$

wherein M is the maintenance variable, Ci is a first pattern coefficient, Xi is a first operating feature, Ci+n is a second pattern coefficient, Xi=n is a second operating feature, and n is an integer having consecutive values.

A method that may include acquiring operating data that describes operation of a valve assembly, calculating one or more operating features from the operating data, the operating feature quantifying operation of the valve assembly, calculating a maintenance variable, comparing the maintenance variable to a threshold criteria related to the operating feature, the threshold criteria associating an operating pattern found in the operating data with a failure mode on the valve assembly, selecting a maintenance task according to a relationship between the maintenance variable and the threshold criteria, the maintenance task related to the failure mode; and generating an output conveying the maintenance task.

The method also wherein the maintenance variable corresponds to one or more values for a key performance indicator that defines performance of the valve assembly.

The method also wherein the maintenance variable includes a pattern coefficient that modifies a value of the operating feature.

The method also further comprising: calculating the maintenance variable in accordance with, $$M = C_i X_i + C_{i+n} X_{i+n} \ldots,$$

wherein M is the maintenance variable, Ci is a first pattern coefficient, Xi is a first operating feature, Ci+n is a second pattern coefficient, Xi=n is a second operating feature, and n is an integer having consecutive values The method also further comprising receiving data that defines the maintenance task that is performed on the valve assembly, incorporating the data into a training set of data, and updating the first pattern coefficient and the second pattern coefficient in accordance with the training set of data.

BRIEF DESCRIPTION OF THE DRAWINGS

Reference is now made briefly to the accompanying drawings, in which.

Figure 1:
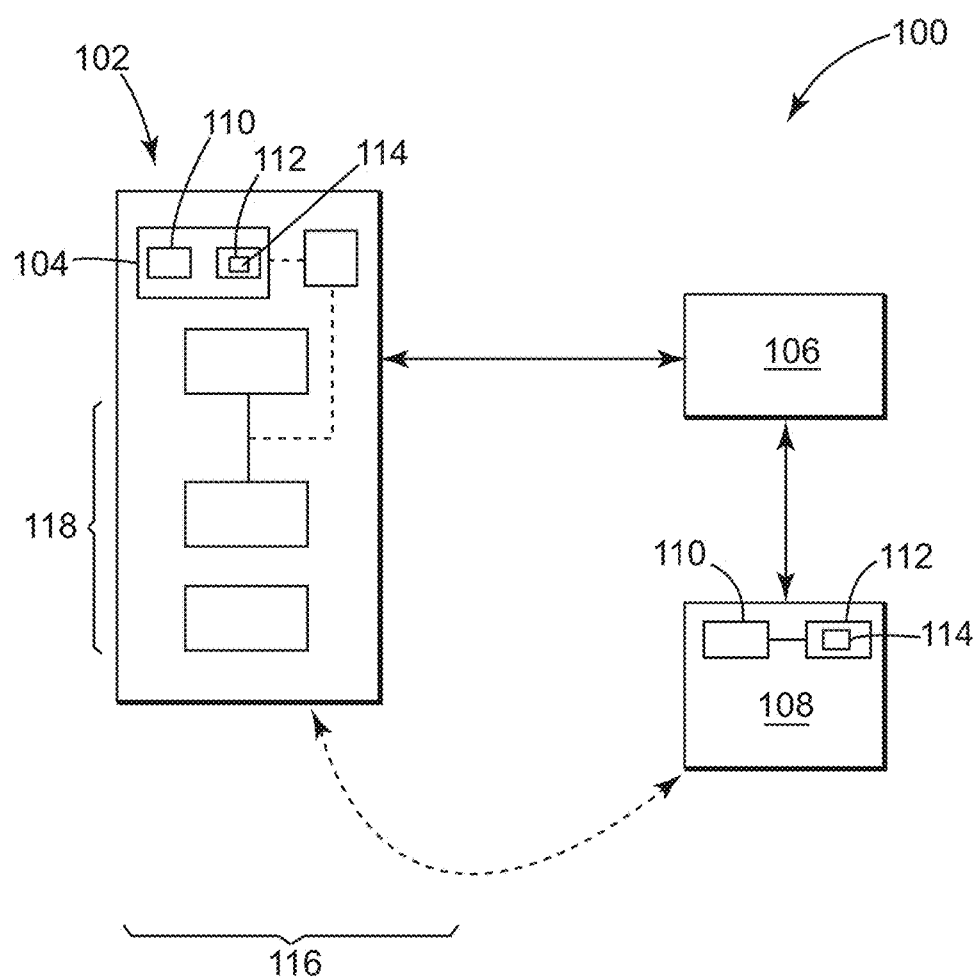
FIG. 1 depicts a schematic diagram of an exemplary embodiment of a system that is configured to predict failure modes on a valve assembly.

Where applicable like reference characters designate identical or corresponding components and units throughout the several views, which are not to scale unless otherwise indicated. The embodiments disclosed herein may include elements that appear in one or more of the several views or in combinations of the several views. Moreover, methods are exemplary only and can be modified by, for example, reordering, adding, removing, and/or altering the individual stages.

DETAILED DESCRIPTION

The discussion that follows describes embodiments of methods that may facilitate preventive maintenance on valve assemblies operating in the field. The embodiments can uncover patterns in operating data that relate to certain root cause or failure modes for these devices. In turn, the embodiments can predict the onset of problems particular to one or more of the valve assemblies. This prediction can trigger an alert and/or other indicator to instruct an end user (e.g., a technician) to perform one or more maintenance and/or service-oriented tasks to avert the potential issues and/or problems. To further improve predictive quality, the embodiments can "learn" from past analysis and/or repair (and maintenance) functions by incorporating features to update information that relates to the root cause or failure modes, often in real-time and/or at the time of service by the end user. This feature can improve the initial identification of maintenance tasks to avoid unnecessary service calls and/or to more accurately diagnose potential problems in the subject devices. Other embodiments are within the scope of the disclosed subject matter.

FIG. 1 depicts a schematic diagram of a system 100 that is configured to predict maintenance requirements on a valve assembly. The system 100 can include a valve assembly 102 with a valve positioner 104 that can regulate operation of the device. The valve positioner 104 can couple with a process controller 106 that is often part of a larger, distributed control system (or, "DCS system"). The system 100 can also have a management server 108 that communicates with the process controller 106 and, in some cases, with the valve positioner 104. Each of the valve positioner 104 and management server 108 can include a processor 110 and a memory 112. Executable instructions 114 may be stored on the memory 112 in the form of computer programs (e.g., firmware, software, etc.) that configure the respective device to enable certain operations and/or functions. In one implementation, the process controller 106 can issue commands to the valve positioner 104 that may correspond with process parameters on a process line 116. The valve positioner 104 can, in turn, process these commands to effect operation of a valve 118 to modulate flow through the valve assembly 102.

At a high level, the system 100 can be configured to monitor operation of the valve assembly 102 to pre-empt failures that might disrupt operation of the process line 116. As noted herein, these configurations can associate patterns in the operating data with a root cause or failure mode that might occur on the valve assembly 102. Use of the system 100 can issue an alert that can serve to provide an end user (e.g., plant or process owner) with information that is sufficient to perform a particular maintenance task that relates to the failure mode.

The system 100 may leverage a "training set" of data to properly indicate the maintenance necessary to avoid failure of the valve assembly 102. This training set may aggregate data from prior and/or contemporaneous operation of the valve assembly 102 and related devices on the process line 116 (or, even, across multiple process lines, facilities, and factories). The data may correlate information about operation of one or more devices (e.g., valve assembly 102) with maintenance records and like annotations that describe and/or define a problem(s) and a corrective action(s) that were necessary to remediate such problem(s) on the corresponding device.

In one implementation, the system 100 can be configured to interrogate the data in the training set. Such configuration can identify, either generally or with specificity, a predictive pattern in the data that is likely to give rise to and/or is related to and/or corresponds with the problem. The system 100 can generate a prediction in the form of, for example, one or more coefficients for an equation that effectively relates the predictive pattern with the corrective action that may be useful to pre-empt the problem. The system 100 can be configured to use these coefficients (and, also, the equation) to analyze operating data from the valve assembly 102 in real-time. This analysis may find patterns that match, or are substantially similar to, the predictive pattern and, in turn, provide appropriate alerts and/or actions to perform maintenance before the failure condition manifests on the valve assembly 102.

Figure 2:
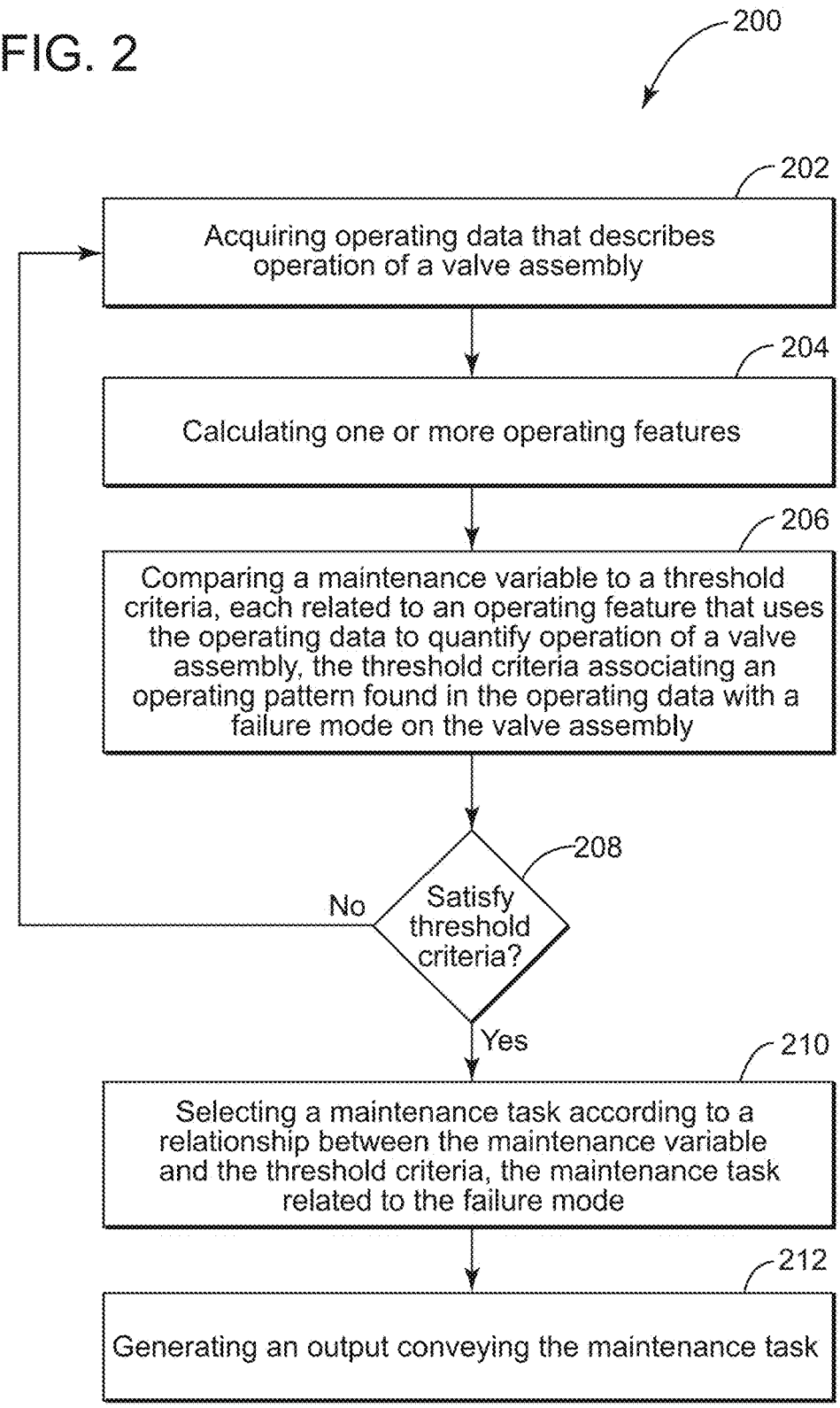
FIG. 2 depicts a flow diagram of an exemplary embodiment of a method for predicting failure modes on a valve assembly.

FIG. 2 depicts a flow diagram of an exemplary embodiment of a method 200 that can leverage the predictive equation to perform real-time analysis of operating data on the valve assembly 102. This diagram outlines stages that may embody the executable instructions 114 for one or more computer-implemented methods and/or programs. In FIG. 2, the method 200 can include, at stage 202, acquiring operating data that describes operation of a valve assembly. The method 200 can also include, at stage 204, calculating one or more operating features that relate to the operating data to quantify operation of the valve assembly. The method 200 may also include, at stage 206, comparing a maintenance variable to a threshold criteria, each related to the one or more operating features, the threshold criteria associating an operating pattern found in the operating data with a failure mode on the valve assembly. The method 200 can also include, at step 208, determining whether the maintenance variable satisfies the threshold criteria. If the threshold criteria are satisfied, then the method 200 can include, at stage 210, selecting a maintenance task according to a relationship between the maintenance variable and the threshold criteria, the maintenance task related to the failure mode and, in one example, at stage 212, generating an output conveying the maintenance tasks. On the other hand, if the threshold criteria are not satisfied, then the method 200 can continued at stage 202 to continue to acquired operating data. The stages in method 200 noted above, or generally herein, may be altered, combined, omitted, and/or rearranged in some embodiments.

At stage 202, the method 200 may acquire operating data that describes operation of the valve assembly 102 (FIG. 1). The operating data can comprise values for certain operating parameters, for example, setpoint (SP), position (P), and actuator pressure (AP), among others. Values for the operating parameters may be collected and/or aggregated over time (t) as one or more datasets. In one implementation, the operating data and/or the datasets can be stored and/or placed in a repository (e.g., a queue, a database, a buffer, etc.) for use in and/or as part of the method 200. It follows then that the method 200 may include one or more steps for accessing the repository to retrieve and/or obtain one or more pieces of the operating data for use in the prevailing stages, as discussed below.

An example of a repository of operating parameters is shown as Table 1 below.

TABLE 1

| Dataset | SP | P | AP | t (sec) |
| --- | --- | --- | --- | --- |
| S1 | SP1 | P1 | AP1 | 1 |
| S2 | SP2 | P2 | AP2 | 2 |
| S3 | SP3 | P3 | AP3 | 3 |
| S4 | SP4 | P4 | AP4 | 4 |

The operating parameters of Table 1 are arranged as datasets (S1, S2, S3, S4) that relate to operation of a single valve assemblies. Moving from the left to right in the Table 1, each of the datasets provides values for setpoint (SP), actuator pressure (AP), position (P), and time (t)). This disclosure contemplates that there is a wide range of other operation parameters that may be included in each dataset in accordance with the concepts disclosed herein. In operation, the system 100 (FIG. 1) may obtain the operating data directly from the valve assembly 102 (FIG. 1) or via an intermediary component, e.g., the management server 108 (FIG. 1). The method 200 may include steps for sampling the operating data according to one or more sampling parameters (e.g., a sample time, sample size, etc.).

At stage 204, for example, the method 200 may use the operating data to calculate (or determine) one or more operating features. In one implementation, the operating feature may assume one or more values for a key performance indicator ("KPIs") that is useful to define performance of the valve assembly 102. Examples of key performance indicators may define values for friction, spring range, lag, stick-slip, and like indicators of performance. The method 200 may include one or more stages for mathematically calculating the values from the operating data, for example, using the values for the operating parameters shown in Table 1 and discussed herein. In other implementations, the operating features may correspond with a time-based trend or like operational tendency (or movement) that can be observed in the operating data. Such time-based trends may be useful to identify changes in one of the operating parameters (e.g., setpoint (SP)) over time; in another example, the time-based trend may quantify changes in the value of one or more key performance indicators as the values for the key performance indicator relates to the operating parameters.

At stage 206, for example, the method 200 can compare the maintenance variable to the threshold criteria. The method 200 can also include one or more stages for calculating the maintenance variable. Generally, the maintenance variable may assume a variety of values that relate to and/or that describe operation of the valve assembly 102 (FIG. 1). In one implementation, the maintenance variable may correspond with Equation (1) below, $$M = X, \qquad \text{Equation (1)}$$

wherein M is the maintenance variable and X is an operating feature. As noted above, the operating feature X may be assigned a value that correlates with one or more KPIs, trends, and like indicators of the operation of the valve assembly 102 (FIG. 1). For trends, the value for the operating feature X may quantify a relative measure for the performance of the particular operating feature. Examples of this relative measure can identify direction (e.g., up and/or down), scale (e.g., increasing and/or decreasing), and incidence (e.g., present and/or absent), among many others. These relative measures may use any metric that is suitable to quantify the trend including, for example, binary metrics that use 0 (e.g., for down and/or downward directions in trend of the operating feature) and 1 (e.g., for up and/or upward directions in the trend for the operating feature).

The maintenance variable may be calculated using a pattern coefficient that modifies the value of the operating feature X. Examples of this pattern coefficient may correspond to the predictive pattern(s) that predict (or are used to predict) failure modes that may occur on the valve assembly 102. In one implementation, the maintenance variable may correspond with Equation (2) below, $$M = C^*X, \qquad \text{Equation (2)}$$

wherein C is a pattern coefficient that modifies the operating feature X. In another implementation, the maintenance variable may integrate more than one operating feature and/or more than one pattern coefficient, as shown in Equation (3) below:

$$M = C_i X_i + C_{i+n} X_{i+n} \ldots, \qquad \text{Equation (3)}$$

wherein M is the maintenance variable, $C_i$ is a first pattern coefficient, $X_i$ is a first operating feature, $C_{i+n}$ is a second pattern coefficient, $X_{i+n}$ is a second operating feature, and n can be an integer having a consecutive value (e.g., 1, 2, 3, . . . ) and, in some embodiments, n can be 100 or more. The integration of multiple operating features (and pattern coefficients $C_i$) may take the form of a linear equation (as shown above); however, this disclosure does contemplate use of the method 200 in which the integration is non-linear (e.g., quadratic) and/or invariably more complex.

Values for the pattern coefficient C may be derived from one or more pattern recognition and/or machine learning techniques (collectively, "pattern recognition techniques" or, simply, "techniques"). These techniques may utilize probability and/or statistical considerations to best associate patterns in data with a particular failure mode and/or operation-related outcome. In one implementation, the method 200 may lend itself to operation via one or more neural networks and/or machine learning techniques that can autonomously aggregate the operating data together with the maintenance data to predict the maintenance required based on the data.

Processes that implement the techniques may operate on a closed or "supervised" data sample, which herein can embody a training set of data. As noted above, the training set of data may include information that defines operation and maintenance of valve assemblies as part of normal (or standard) maintenance procedures and/or field service operations. The training set of data may arrange the information as one or more individual datasets, each with various pieces of information that define operation of the valve assembly 102 (and/or a plurality of valve assemblies). The information in the datasets can include values for operating parameters and operating features. Each of the datasets can also correlate the information with entries that quantify a response to one or more failure modes (or root cause of failure) discovered during maintenance. The training set may be acquired and stored and/or retaining in a repository (e.g., a queue, a database, a buffer, etc.).

An example of a repository of training set data is shown as Table 2 below.

jugate gradient method," and like iterative functions and algorithms. In one implementation, the method 200 may include one or more stages for receiving and/or retrieving the value(s) for the pattern coefficient(s) $C_i$ from a repository and/or a storage memory. In other embodiments, the method 200 may include one or more stages for determining the value(s) for the pattern coefficient(s) C and/or for updating the value(s) for the pattern coefficient(s) $C_i$, as desired. For updating, the stages of the method 200 may include one or more stages for writing data to the training set of data (e.g., Table 2). This data may embody new entries into the training set of data that are collected during the lifetime operation of the valve assemblies (e.g., $V_1$ and $V_2$). The updated information in the training set of data can enhance machine learning by expanding the breadth of information that is available for use to predict potential failures and/or potential failure root causes on the valve assemblies found on the process line 116 (FIG. 1) or, more generally, in the field across multiple process lines, facilities, factories.

Some embodiments of the method 200 may rely on observable trends in the operating data. These observations may occur in lieu of the algorithms and/or other mathematically-based analysis that may coincide with the pattern

TABLE 2

| | Operating Parameters | | | | Operating Features | | Maintenance Required? |
|---|---|---|---|---|---|---|---|
| Dataset | SP | P | AP | t (sec) | Feature 1 | Feature 2 | 0 = No; 1 = Yes |
| $V_1 1$ | $SP_1 1$ | $P_1 1$ | $AP_1 1$ | 1 | $A_1 1$ | $B_1 1$ | 0 |
| $V_1 2$ | $SP_1 2$ | $P_1 2$ | $AP_1 2$ | 2 | $A_1 1$ | $B_1 1$ | 1 |
| $V_1 3$ | $SP_1 3$ | $P_1 3$ | $AP_1 3$ | 3 | $A_1 1$ | $B_1 1$ | 1 |
| $V_1 4$ | $SP_1 4$ | $P_1 4$ | $AP_1 4$ | 4 | $A_1 1$ | $B_1 1$ | 0 |
| $V_2 1$ | $SP_2 1$ | $P_2 1$ | $AP_2 1$ | 1 | $A_2 1$ | $B_2 1$ | 1 |
| $V_2 2$ | $SP_2 2$ | $P_2 2$ | $AP_2 2$ | 2 | $A_2 1$ | $B_2 1$ | 1 |
| $V_2 3$ | $SP_2 3$ | $P_2 3$ | $AP_2 3$ | 3 | $A_2 1$ | $B_2 1$ | 1 |
| $V_2 4$ | $SP_1 4$ | $P_2 4$ | $AP_2 4$ | 4 | $A_2 1$ | $B_2 1$ | 0 |

The training set data of Table 2 includes datasets that relate to operation of two valve assemblies (e.g., $V_1$ and $V_2$). Moving from the left to right in the Table 2, each of the datasets provide values for operating parameters (e.g., set-point (SP), actuator pressure (AP), position (P), and time (t)), values for operating features (e.g., key performance indicators), and a binary indication (e.g., 0, 1) to associate whether maintenance was required for the information in each dataset. The binary indication is useful herein to offer one implementation of the embodiments; this disclosure contemplates that the techniques herein can use use other indications of varying level of sophistication from simple (e.g., alphabetic, numeric, etc.) to complex (e.g., written sentences, natural language descriptors, etc.).

The pattern recognition techniques can define one or more algorithms that use the information in the training set of data (e.g., training set data of Table 2) to determine a value for the pattern coefficient $C_i$. This value may be determined prior to execution of the method 200, although contemporaneous operation of such algorithms may also be realized with the scope and content of the discussion herein. In one implementation, the algorithms of the pattern recognition techniques may be associated with various mathematical concepts that operate to find the value(s) for the pattern coefficient(s) $C_i$ that minimize the error of the maintenance variable M that is computed using Equation (2) and like computations. These concepts include, for example, the "method of steepest decent," (or "gradient decent"), "conrecognition techniques. In one implementation, the method 200 may include one or more stages for finding trends in the operating data and/or operating features over a time period (e.g., a day, a week, a month, etc.) and associating the trend(s) to the maintenance task. The trends may indicate an increasing (or decreasing) tendency in certain operations. Such trends may, in turn, require certain maintenance to occur that will stabilize the trend and/or to cause the trend to change direction to return back to the nominal and/or default level.

At stage 208, the method 200 can determine whether the calculated maintenance variable satisfies the threshold criteria. The method 200 may include stages to identify the relative position (e.g., greater than, less than, equal to, not equal to, etc.) between the maintenance variable and the threshold criteria. Examples of the threshold criteria can be useful to indicate that a valve assembly (e.g., valve assembly 102) is in need of maintenance to pre-empt a failure condition. These examples may include a maximum value and/or minimum value, either of which may be associated with the configuration of the maintenance variable. In one implementation, when the maintenance variable M embodies only the operating feature X (as shown in Equation (1) above), the method 200 may employ the threshold criteria to identify that the value for the maintenance variable exceeds the maximum value for, e.g., a key performance indicator (KPI) and, thus, will detect the presence of the failure modes associated therewith.

The method 200 may also be configured with stages to equate the maintenance variable M with a threshold criteria TC. Examples of the threshold criteria TC can be any numeric value (e.g., 0 and/or 1) that is useful to differentiate the calculated value for the maintenance variable M for purposes of identifying a maintenance task. In one implementation, the method 200 may include one or more stages to compare the computed maintenance variable M to the threshold criteria TC. This comparison can identify a relationship between these two values. The method 200 may, in turn, use this relationship to identify a maintenance task that is appropriate to address the problems associated with maintenance variable M. In one implementation, values for the maintenance variable M that are greater than the threshold criteria TC require a maintenance task and values for the maintenance variable M that are less than the threshold criteria TC do not require a maintenance task.

Figure 3:
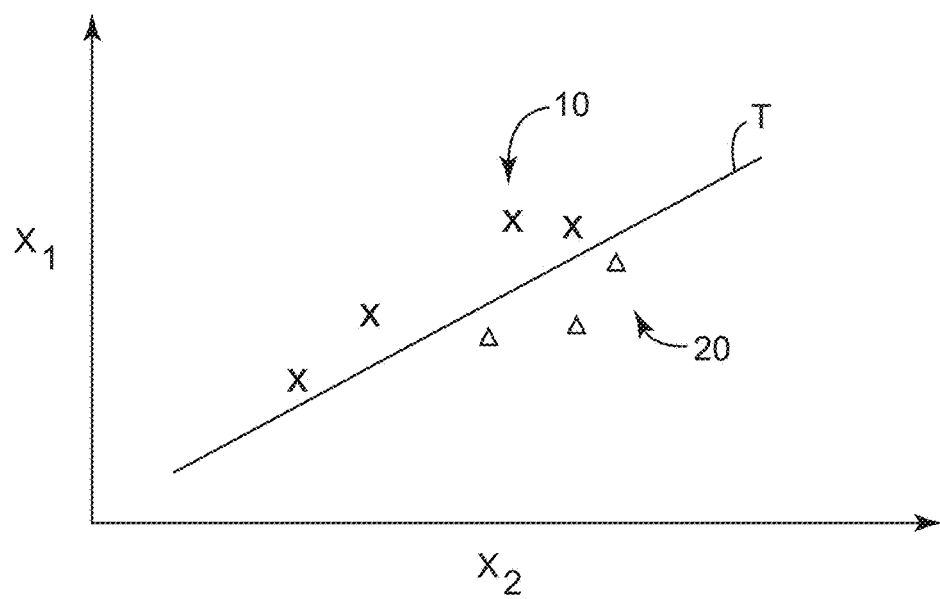
FIG. 3 depicts a plot of data that may result from implementation of the method of FIG. 2.
Figure 4:
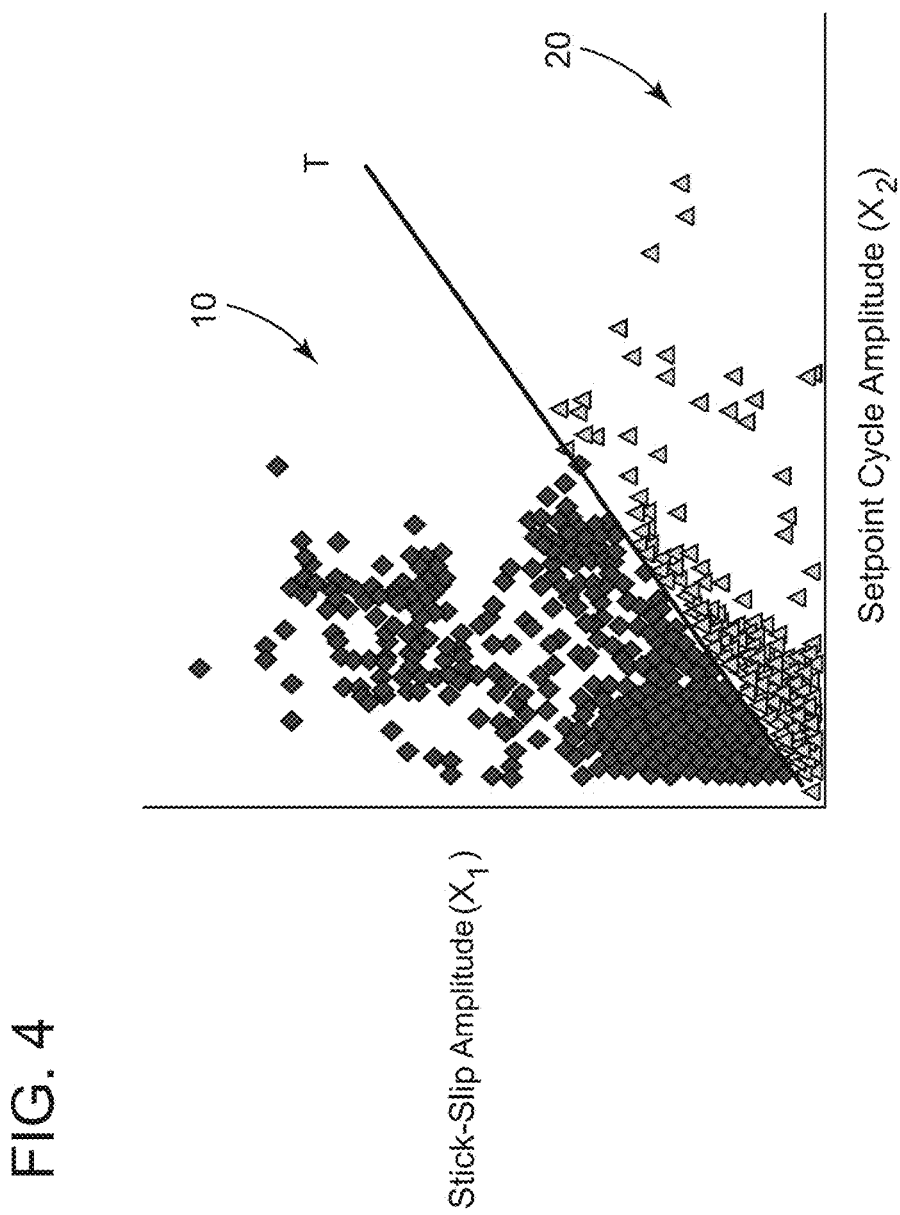
FIG. 4 depicts a plot of data that may result from implementation of the method of FIG. 2.

FIGS. 3 and 4 provide graphical representations to illustrate one implementation of the method 200 to identify the maintenance task. These graphical representations include a plot of data to visualize operation of Equation (7) above to calculate the maintenance variable M and to understand the relationship of the value of the maintenance variable M with the threshold criteria TC. This relationship may determine the maintenance task for a particular valve assembly.

FIG. 3 depicts a plot for a generic implementation of the method 200 to analyze two operating features $X_1$ and $X_2$. The plot arranges calculated values for the maintenance variable M in two groups of data (e.g., a first group 10 and a second group 20). The groups 10, 20 are separated by a threshold line T, itself embodying an error value determined for a given combination of pattern coefficients $C_1$ and $C_2$ and the actual value of the maintenance variable M that result from operation of the pattern recognition techniques on the training set, as discussed herein.

FIG. 4 depicts a plot for a more specific implementation of the method 200 to determine a maintenance task. This implementation uses operating features that define an amplitude for stick-slip cycling ($X_1$) and an amplitude for setpoint cycling ($X_2$). In this example, the threshold line T is useful to separate valve assemblies that require maintenance (e.g., first group 10) from valve assemblies that don't require maintenance (e.g., second group 20). In this particular example, the threshold line T defines values for the threshold criteria TC that can indicate that a particular combination of stick-slip X1 and setpoint cycling X2 is indicative of cycling that occurs on the valve assembly itself (e.g., first group 10) or is indicative of cycling that is the result of variations in the process (e.g., second group 20).

At stage 210, the method 200 can select an appropriate maintenance task. Examples of the maintenance task may require an end user to, at least, test the valve assembly 102 (FIG. 1) to confirm the results of the predictive analysis. For the example of FIG. 4, the end user may need to lubricate the valve assemblies that are identified in the first group 10. The operating data of these valve assemblies indicates problems with valve cycling, which in turn can frustrate operation of the valve assembly to regulate flow of fluid.

At stage 212, the method 200 can generate the output. This output can embody an alert of suitable composition (e.g., a message, an audible sound, etc.). The alert may indicate the problem(s) and/or corresponding maintenance task or solutions to the problems with the valve assembly 102. This alert may be directed at the end user (e.g., a plant operator, technician, etc.); for example, the alert may operate as an input to a collateral software program that the end user utilizes to manage plant operation and/or device diagnostics.

The input may cause the collateral software program to modify a user interface to solicit action (e.g., an input) by the end user. Examples of the alert may require or solicit the end user to verify the failure mode and/or to add additional annotations and/or notations as to any different finds that occur upon physical inspection and/or maintenance of the valve assembly 102. These additions may be included in the training set so as to update one or more of the pattern coefficients for use, e.g., in the Equations (2) or (3).

As noted above, embodiments may be configured to evolve or "learn" over time. The method 200 may include, for example, one or more stages for receiving data that defines the maintenance task that is performed on the valve assembly. This new data may include the additional annotations and/or notations that identify a maintenance task that is different from the maintenance task the stages originally predicted using the stages set forth above. In turn, the method 200 may include one or more stages incorporating the new data into the training set (e.g., Table 2) and relate the new data with operating parameters and/or operating features that prevail at the time that the maintenance task occurs on the device. With respect to Equation (3) above, the method 200 may further include one or more stages for updating the first pattern coefficient and the second pattern coefficient in accordance with the training set of data.

Over time these embodiments can aggregate data to better qualify the relationship between the operating data (and operating features) and the maintenance task. These features can more accurately diagnosis problems, effectively lowering costs of maintenance by avoiding improper and/or ill-timed maintenance and service calls to the process line. In practice, the methods 200 may be useful to take advantage of the new data to explore and/or reassess operating of devices with personnel in the field. For example, the method 200 may include one or more stages for analyzing devices at a particular installation in accordance with the new pattern coefficients and/or new relationships that are established between the maintenance tasks and the operating features. These stages can allow the end user to identify valves not previously diagnosed with a particular problem would now be considered problematic based on the new, or "learned" information. In one implementation, the method 200 may be configured with stages for automatically analyzing all devices based on changes in the training set of data.

Figure 5:
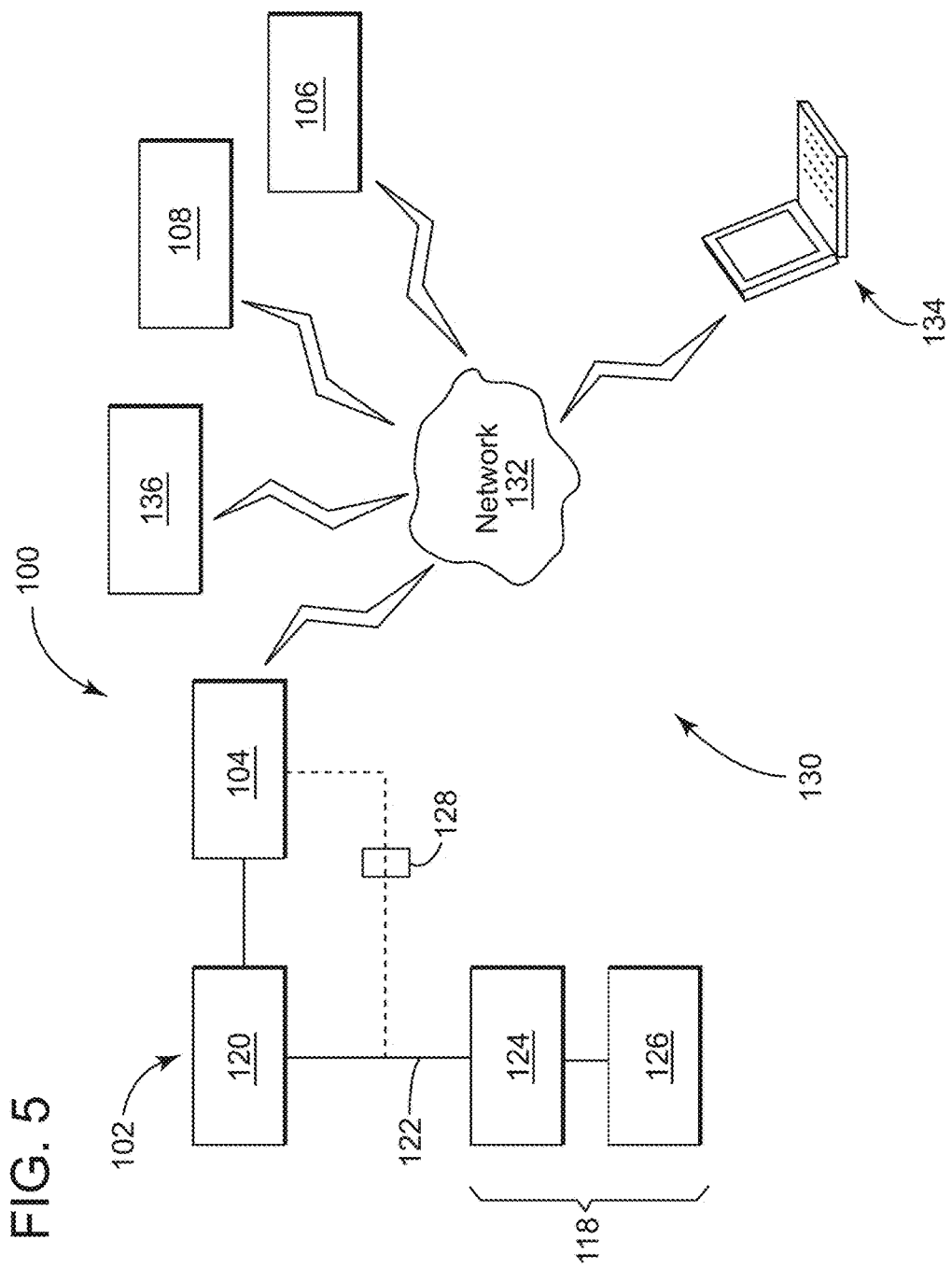
FIG. 5 depicts a schematic diagram of an example of the system of FIG. 1.
Figure 6:
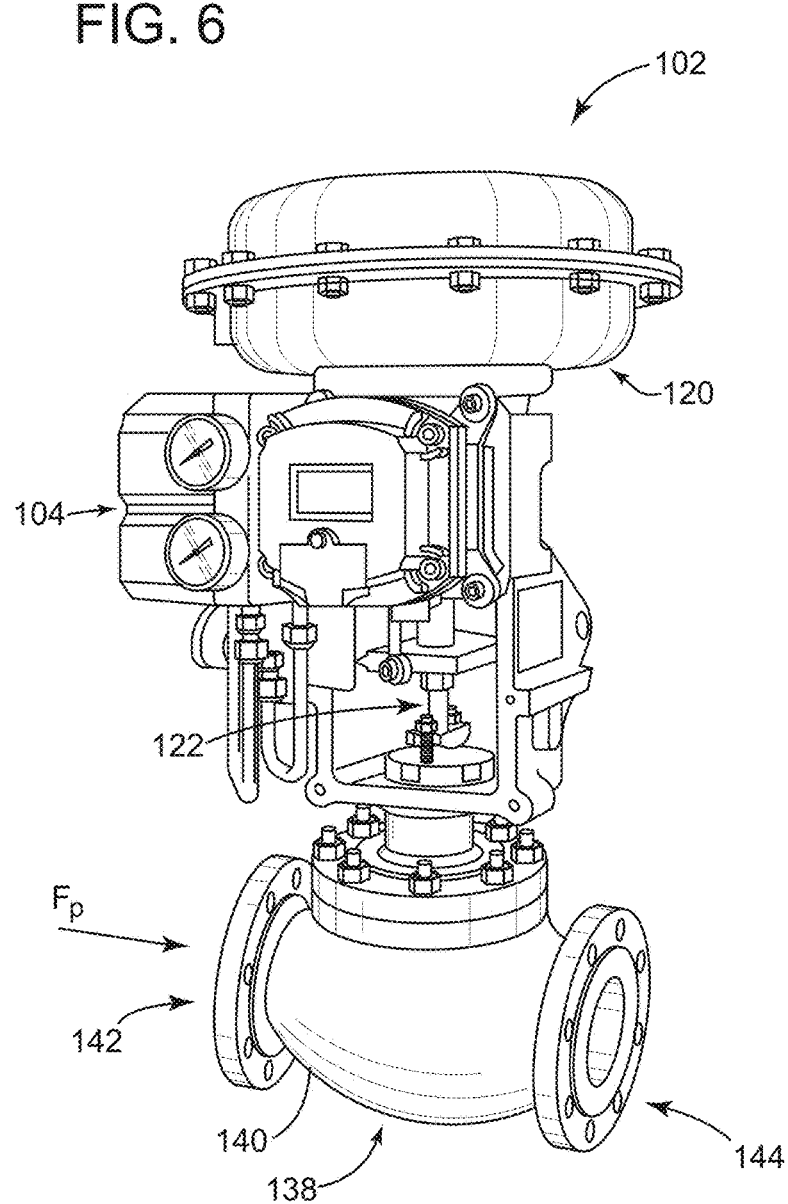
FIG. 6 depicts a perspective view of an example of the valve assembly of FIG. 5.
Figure 7:
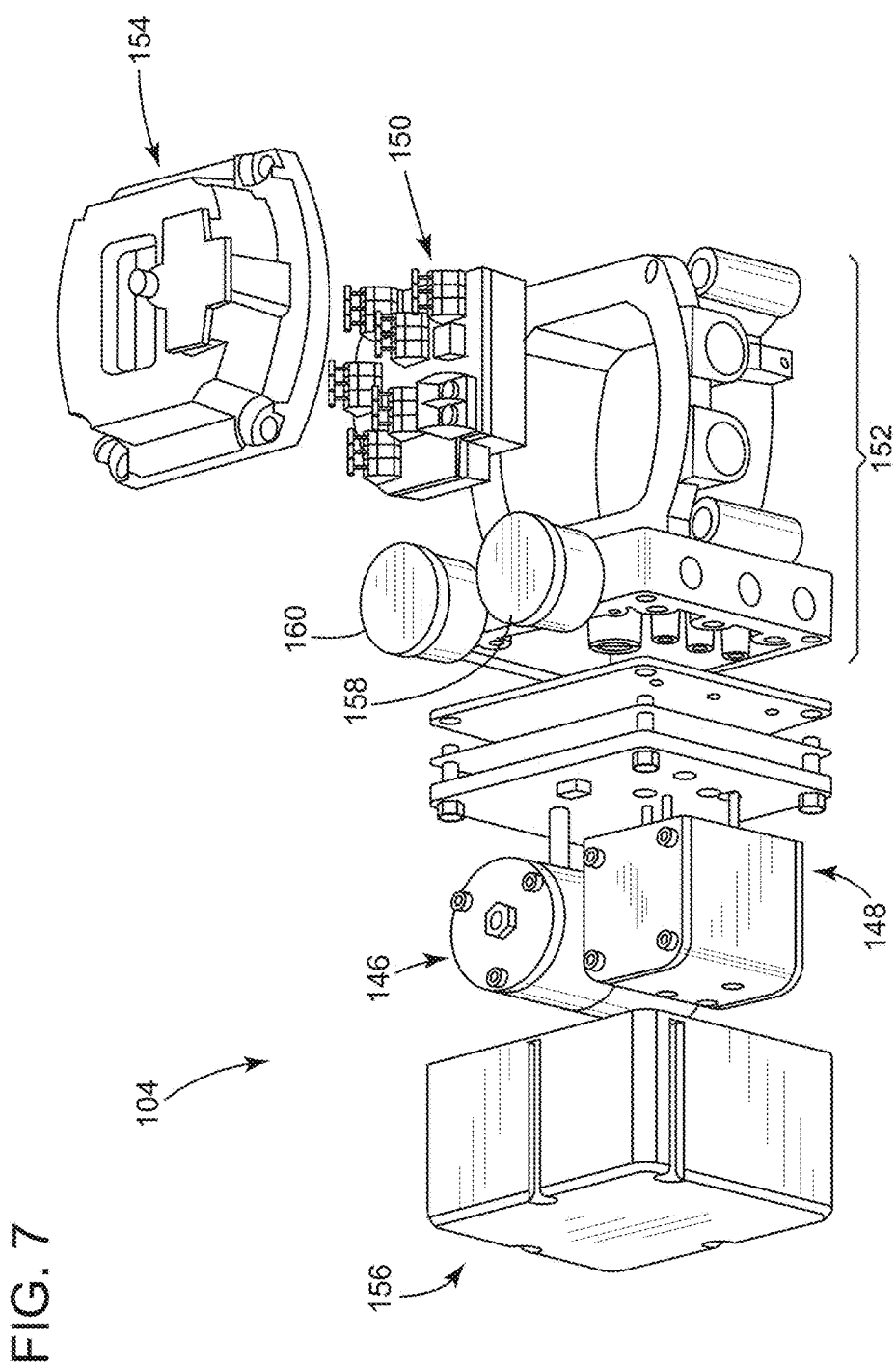
FIG. 7 depicts an exploded assembly view of a valve positioner on the valve assembly of FIG. 6.

The discussion now turns to configurations for the devices and systems that may implement the method 100. FIGS. 5, 6, and 7 depict an example of a valve assembly 102 (FIGS. 5 and 6) and a system 100 (FIG. 5) that can employ the embodiments disclosed herein. These examples can be useful to regulate process fluids in industrial process lines typical of industries that focus on chemical production, refining production, and resource extraction. FIG. 5 illustrates a schematic diagram of the valve assembly as part of a process control system. FIG. 6 shows a perspective view of the exemplary valve assembly. FIG. 7 provides an exploded assembly view of components of the valve positioner.

In FIG. 5, the valve positioner 104 can couple with an actuator 120 to operate the valve 118. The valve 118 can include a stem 122, a closure member 124, and a seat 126. The valve positioner 104 can also couple with a position sensor 128 that can be configured to generate an input signal. Examples of the position sensor 128 can include proximity sensors, transducers (e.g., Hall Effect sensors), and like devices. The management server 108 can be configured to retrieve and process operating data that relates to operation of the valve assembly 102. These processes can generate outputs that are useful to perform device diagnostics that define and identify problematic operation of the valve assembly 102 during use on the process line 116. The management server 108 can be configured to run certain diagnostic and/or operative software and programs for data analysis.

The system 100 can include a network system 130 that includes a network 132. Examples of the network 132 can transfer data, information, and signals by way of wired protocols (e.g., 4-20 mA, FOUNDATION® Fieldbus, HART® etc.) and/or wireless protocols, many of which find use in a plant or factory automation environment. These protocols may facilitate communication over the network 132 between the valve positioner 104, the process controller 106, the management server 108, a terminal 134, and/or an external server 136. During operation, the process controller 106 can execute one or more computer programs to deliver a command signal to the valve positioner 104. The command signal may identify a commanded position for the closure member 124. The valve positioner 104 can use the commanded position to modulate the instrument gas to the actuator 118 and, effectively, allow the closure member 124 to move relative to the seat 126. As noted herein, feedback in the assembly from the position sensor 128 can provide the valve positioner 104 with the position of the valve stem 122. This position corresponds with the location and/or position of the closure member 124 relative to the seat 126.

Implementation of the method 200 and its embodiments may configure particular components of the system 100 for particular functionality useful to automatically identify and derive alerts for maintenance. The valve positioner 104, for example, may implement all of the stages of the method 200 and can provide the necessary alerts on-board the valve assembly 102. In one implementation, the management server 108 may be configured to implement the embodiments; in such configuration, the management server 108 may provide a control signal (also, "input") to the valve positioner 104 that comprises data that relates to the alert that may instruct the valve positioner 104 to modulate operation of the valve 120 to avoid potential problems and/or to pre-empt problems until proper maintenance occurs, as desired. In other implementations, the valve positioner 104 and the management server 108, together and/or in combination with other components of the system 100, can be configured to implement the stages contemplated herein to update the calibration variable(s).

In the example of FIG. 6, the valve assembly 102 can include a fluid coupling 138 with a body 140 that has a first inlet/outlet 142 and a second inlet/outlet 144. The fluid coupling 138 can include components of the valve in the interior to the body 140 and, thus, these components (e.g., the closure member 124 and the seat 126 of FIG. 5) are not shown in the present view. This structure can modulate a flow of process fluid $F_P$ between the inlet/outlets 142, 144.

FIG. 7 depicts the valve positioner 104 in exploded form. As noted above, the valve positioner 104 can have components that generate the pneumatic signal to the actuator 118. The valve positioner 104 can have a plurality of positioner components (e.g., a converter component 146, a relay component 148, and a processing component 150). The valve positioner 104 can also have a housing 152. One or more covers (e.g., a first cover 154 and a second cover 156) can secure with the housing 152 to form an enclosure about the positioner components 146, 148, 150. This enclosure can protect the positioner components from conditions that prevail in the environment surrounding the valve assembly 102. The valve positioner 104 can also include one or more gauges (e.g., a first gauge 158 and a second gauge 160) that can provide an indication of the flow conditions (e.g., pressure, flow rate, etc.) of the instrument gas that the valve positioner 104 uses to operate the valve in the valve assembly 102. In one example, operation of the positioner components 146, 148, 150 can maintain the position of the valve members in the body 140 to modulate flow of the process fluid $F_P$ across the inlet/outlets 142, 144.

Data may reside on a data source, often locally in one or more memories on the valve positioner 104, although this disclosure also contemplates configurations in which the data resides on the system 100. For example, the data source may integrate with the management server 108 and/or as part of the external server 136. At the data source, the data may be arranged as one or more data sets that include one or more data samples. The data sets may be identified by an indicator (e.g., a date stamp, a time stamp, a date/time stamp, etc.) that relates to the chronological time at which the data samples in the data set were gathered and/or stored, e.g., in memory. For real-time use of the methods, the data samples may be read into a buffer and/or like configured storage medium that allows for ready access to the data samples to afford the methods with chronologically relevant data, taking into consideration necessary data processing time-lag. In one embodiment, the methods may include one or more stages for obtaining and/or retrieving the data from the data source.

Figure 8:
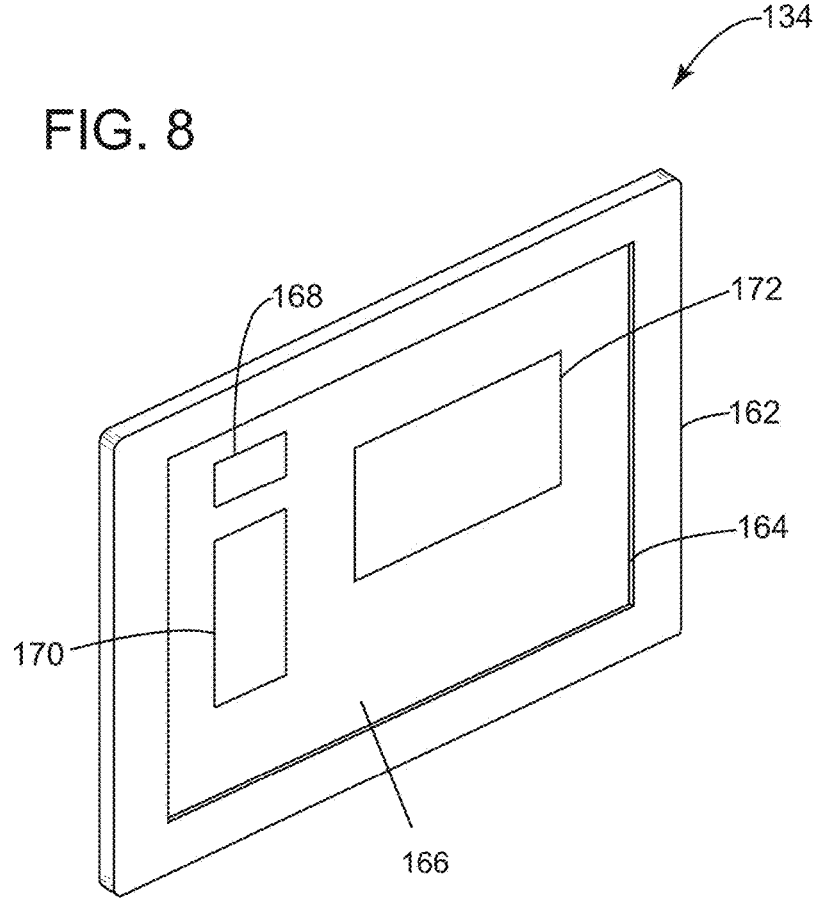
FIG. 8 depicts a schematic diagram of an example of a terminal device for use to receive data input for use in the system of FIGS. 1 and 5.

FIG. 8 depicts a schematic diagram of an example of the terminal 134 that may be used to capture information for use in the training set as noted herein. The terminal 134 may assume a form factor 162, e.g., mobile and/or stationary. In one implementation, the form factor can embody a tablet, smartphone, and/or like input device that the end user can carry in the field to enter data and/or receive alerts. These devices can include a display 164 to present a user interface 166 to the end user. The user interface 166 can include one or more fields, typically a device identification field 168, a display control field 170, and a data viewing and entry field 172.

At a high level, the user interface 166 provides a tool for the end user to capture data that relates to operation of valve assemblies (and/or devices) in the field. The device identification field 168 may provide one or more visual indications to identify these devices. For granularity, the visual indications may include a serial number, image, and/or other identifying information for a particular valve assembly. The information on the user interface 166 may, in turn, conform and relate to this particular valve assembly. In one implementation, the user interface 166 can be configured to change the information in response to selection from the end user, e.g., by clicking on an icon in the display control field 170, to select a different valve assembly. This feature may be particularly useful to tailor the information found in the data viewing and entry field 172. The field 172 may be configured to display operating data values and operating features, whether in tabular format and/or graphical plots. Trend graphs of these values over time may be helpful to improve diagnosis of problems and to confirm maintenance tasks. In this respect, the field 172 may also be configured to receive inputs from the end user with new data that relates to the maintenance tasks. This feature may be beneficial for use by the end user to update the training set, effectively capturing annotation and/or notations about the maintenance task that the end user performs (or does not perform) at the time of service. As noted above, this new data can help to facilitate "learning" to improve predictive behaviors of the embodiments disclosed herein.

In view of the foregoing, the embodiments herein can predict failure conditions on a valve assembly. At least one exemplary technical effect is to provide an alert and/or indication that can facilitate maintenance to avoid failure of the device.

The embodiments may be implemented on any device where relevant data is present and/or otherwise accessible. For example, the embodiments can be implemented as executable instructions (e.g., firmware, hardware, software, etc.) on the valve positioner. The valve positioner can transmit the output of the embodiments to a distributed control system, asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computing device. The historian is conventionally connected to the asset management system or distributed control system. The diagnostic computing device has all the capabilities of the monitoring computer and, often, the additional capability to execute executable instructions for the embodiment to process the given data. In another embodiment, the valve positioner is configured to send data by wires or wirelessly to the diagnostic computing device, as well as through peripheral and complimentary channels (e.g., through intermediate devices such as a DCS or may be connected directly to the diagnostic computer).

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the disclosed subject matter may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
acquiring operating data that describes operation of a valve assembly on a process line;
calculating amplitude for stick-slip cycling and amplitude for setpoint cycling from the operating data;
calculating a maintenance variable, wherein the maintenance variable includes a pattern coefficient that modifies a value of the amplitude for stick-slip cycling and the amplitude for setpoint cycling;
comparing the maintenance variable to a threshold criteria related to the amplitude for stick-slip cycling and the amplitude for setpoint cycling, the threshold criteria delimiting data into two groups including a first group where a combination of stick-slip cycling and setpoint cycling indicates that stick-slip prevails on the valve assembly and a second group where the combination of stick-slip cycling and setpoint cycling indicates cycling of the valve assembly that results from process variations occurring on the process line;
wherein the maintenance variable is calculated in accordance with, $$M = C_i X_i + C_{i+n} X_{i+n},$$

wherein M is the maintenance variable, $C_i$ is a first pattern coefficient, $X_i$ is the amplitude for stick slip cycling, $C_{i+n}$ is a second pattern coefficient, $X_{i+n}$ is the amplitude for setpoint cycling, and n is an integer having consecutive values;
selecting a maintenance task according to a relationship between the maintenance variable and the threshold criteria, wherein the maintenance task relates to stick-slip on the valve assembly in response to the combination of stick-slip cycling and setpoint cycling is in the first group that is indicative of cycling that occurs on the valve assembly itself;

using the maintenance task to maintain operation of the process line on which the valve assembly is installed by, generating an output in the form of an alert that corresponds with corrective action to the valve assembly; and causing the valve assembly to modulate operation of the valve to change flow through the valve assembly in response to a control signal that relates to the alert so as to avoid a failure condition on the valve assembly that would disrupt operation of the process line.

2. The method of claim 1, wherein the maintenance variable integrates more than one of the pattern coefficient.

3. The method of claim 1, wherein the maintenance variable takes the form of a linear equation.

4. The method of claim 1, further comprising:
updating the relationship between the maintenance variable and the threshold criteria in accordance with the pattern coefficient.

5. The method of claim 1, wherein the maintenance variable includes a pattern coefficient that modifies a value of the amplitude for stick-slip cycling and the amplitude for setpoint cycling.

6. The method of claim 1, wherein the maintenance variable integrates more than one of the pattern coefficient and more than one of the operating feature.

7. The method of claim 1, wherein the maintenance variable corresponds to one or more values for the amplitude for stick-slip cycling and the amplitude for setpoint cycling that defines performance of the valve assembly.

8. The method of claim 1, further comprising:
receiving data that defines the maintenance task that is performed on the valve assembly;
incorporating the data into a training set of data; and
updating the first pattern coefficient and the second pattern coefficient in accordance with the training set of data.

\* \* \* \* \*